United States Patent [19]

Kehl et al.

[11] Patent Number: 5,039,496

[45] Date of Patent: Aug. 13, 1991

[54] PROCESS FOR SELECTIVE EXTRACTION OF CONTAMINANT ELEMENTS FROM MIXTURES OF ELECTROLYTES IN SOLUTION

[75] Inventors: Ralf Kehl, Duesseldorf; Werner Schwab, Langenfeld, both of Fed. Rep. of Germany; Robert B. Sudderth; Gary A. Korkosky, both of Tucson, Ariz.

[73] Assignee: Henkel Kommanditgesellschaft auf Aktien, Duesseldorf-Holthausen, Fed. Rep. of Germany

[21] Appl. No.: 428,275

[22] Filed: Oct. 27, 1989

[30] Foreign Application Priority Data

Oct. 28, 1988 [DE]  Fed. Rep. of Germany ....... 3836731

[51] Int. Cl.$^5$ .............................................. C22B 15/00
[52] U.S. Cl. ........................................ 423/24; 423/87; 75/722
[58] Field of Search ......................... 423/24, 32, 87, 88

[56] References Cited

U.S. PATENT DOCUMENTS

| | | | |
|---|---|---|---|
| 3,464,784 | 9/1969 | Swanson | 23/22 |
| 3,900,551 | 8/1975 | Bardoncelli et al. | 423/9 |
| 4,061,564 | 12/1977 | De Schepper et al. | 210/21 |
| 4,102,976 | 7/1978 | Heimeleers et al. | 423/87 |
| 4,115,512 | 9/1978 | Kerfoot | 423/24 |
| 4,503,015 | 3/1985 | Marr et al. | 423/24 |
| 4,547,346 | 10/1985 | Guerriero et al. | 423/87 |
| 4,834,951 | 5/1989 | Schwab et al. | 423/87 |

OTHER PUBLICATIONS

J. Chem. Research (S), 1982), 90 ff, Solvent Extraction of Metals by Versatohydroxamic Acid, Frederick Vernon, Natalino A. Banja and Mohmed O. B. Karrier.

*Primary Examiner*—Theodore Morris
*Assistant Examiner*—Edward Squillante
*Attorney, Agent, or Firm*—Ernest G. Szoke; Wayne C. Jaeschke; Norvell E. Wisdom, Jr.

[57] ABSTRACT

Prior art processes for removal of one or more contaminant elements, including at least one of antimony, bismuth, and arsenic and optionally including iron, from electrolyte solutions of primary metals by solvent extraction with an organic phase including a hydroxamic acid, then precipitating at least part of the contaminant elements from the organic phase as sulfides, are improved by an additional step of re-extracting the organic phase with water before precipitating the sulfides from it. At least part of any arsenic present and, if desired, part of any antimony as well, may be re-extracted in this manner and subsequently recovered if desired, so that the overall process is made more economical.

21 Claims, No Drawings

PROCESS FOR SELECTIVE EXTRACTION OF CONTAMINANT ELEMENTS FROM MIXTURES OF ELECTROLYTES IN SOLUTION

FIELD OF THE INVENTION

This invention relates to an improved process for the removal of contaminant elements selected from arsenic, antimony, bismuth, and/or iron from electrolyte solutions also including at least one other metal of primary economic importance. The metal or metals of primary economic interest and importance in the solution are denoted hereinafter as the "primary metal(s)"; by others these are often called the "valuable metal(s)", from the German word "Wertmetall(e)". Processes according to the invention involve liquid phase extraction, and often include subsequent recovery of the "contaminant" elements for separate use in their own economically valuable applications.

STATEMENT OF RELATED ART

In the industrial winning of primary metals from their natural sources, and more particularly from their ores, hydrometallurgical processes play an important role along pyrometallurgical processes. The metals or metal salts contained in the ores are often digested or leached with aqueous systems, and the primary metal can be obtained from such metal salt solutions by electrolysis. However, the electrolysis of such aqueous solutions is usually impaired in its efficiency by the fact that most of the primary metals in ores are associated with other metals. Thus, the electrolyte solutions for the recovery of primary metals nearly always contain contaminant elements which adversely affect the electrolytic recovery of the primary metal or are electrodeposited as impurities together with the primary metal. Therefore, in order to increase the purity of the electrolytically deposited primary metals, a removal of as much as possible of the contaminant elements from the electrolyte solutions of primary metals is desirable.

The isolation of the metals copper, zinc, cobalt, or nickel, for example, is industrially feasible via electrolysis. However, aqueous solutions from the leaching of ores containing said metals usually contain contaminant elements. Satisfactory processes for removal, and usually also recovery, of such contaminant elements are desired, not only because thereby the quality and quantity of the primary metals deposited can be improved, but also because the contaminant elements have their own separate economic value when recovered, and environmental pollution is avoided by such recovery.

The usual industrial production of highly pure copper, for example, is characterized by two separate process steps. In the first step, relatively impure copper derived from the smelting of copper ores is deposited from a melt. In the course of the following refining electrolysis, copper from the first step is used as the anode with an aqueous electrolyte solution, usually containing sulfuric acid and copper sulfate, and contaminant elements are separated and in part precipitated as a sludge in the vicinity of the anodes, while a highly conductive, so-called "electrolytic", copper having a purity up to 99.99% is deposited on the cathode. The cathode billets of highly pure copper thus produced can be further processed by rolling, drawing, pressing, and other metal forming operations.

Many sources of potential interference with the copper-refining electrolysis occur in commercial practice. The concentration of the contaminant elements arsenic, antimony, bismuth, and iron in the electrolyte solutions used for refining increases with the amount copper refined, particularly when—as is done to an increasing degree—ores rich in such contaminant elements are used. Not only does an accumulation of the contaminant elements reduce the quality of the cathodically deposited copper, which contains increasing amounts of arsenic, antimony, and bismuth impurities, but it also reduces the current efficiency, because some of the current is wasted by oxidizing ferrous iron to ferric iron at the anode and the reverse reaction at the cathode.

Many processes are known from prior art whereby arsenic, and in a few cases antimony as well, can be removed from the solutions used for electro-refining copper. In all of these processes, upon reaching a critical concentration of the contaminant elements in the electrolyte solutions, and more particularly upon reaching a limit of 10 g/l of arsenic, a side stream of the electrolyte solution is withdrawn from the tanks used for refining and then subjected to a so-called copper recovering electrolysis. In the course thereof, not only the residual copper but also the contaminant elements are electrolytically deposited from the solution. The relatively impure copper obtained thereby will have to be refined and thereby to be brought to the desired purity, before it is used. After the noted electrodeposition, relatively high amounts of nickel will remain in the strong sulfuric acid electrolyte solution. Upon evaporation, nickel is precipitated as crude nickel sulfate, and the remaining electrolyte is subjected to a further purification for removing iron, arsenic and, if required, antimony impurities. The resulting concentrated waste sulfuric acid is, to the largest extent practical, recycled into the process.

DE-OS 26 03 874 describes a process for the removal of arsenic from copper-refining electrolytes, wherein the aqueous electrolyte solution is contacted with an organic phase containing tributylphosphate and thereby the arsenic contained in the solution is extracted into the organic phase. In a process according to U S. Pat. No. 4,115,512, there is also used as extractant an organic solution containing tributylphosphate in admixture with quaternary ammonium compounds. Tributylphosphate ("TBP") as well as organic esters of phosphonic acid, phosphonous acid, phosphinic acid and phosphinous acid are employed in combination with organic solvents in processes according to DE-OS 26 14 341 and DE-OS 26 15 638 as extractants to remove arsenic or antimony from copper electrolyte solutions. Arsenic is removed from electrolytes of the refining of copper also by means of organophosphorus compounds, for example trioctylphosphine oxide (TOPO), in an organic solvent such as kerosene in a process according to EP-A-0 106 118.

In DE-OS 34 23 713 there is disclosed another process for the removal of arsenic from sulfuric acid-containing electrolytes, in which process aliphatic alcohols having from 6 to 13 carbon atoms, preferably 2-ethyl-1-hexanol, in an organic phase are used as extractants. A large portion, even if not the total amount, of arsenic can be removed from the electrolyte solution in the course of six extraction cycles.

However, all of the processes mentioned have the following drawbacks: The reagents must be employed in a high concentration in order to accomplish an efficient extraction of the contaminant elements from the electrolyte solutions. This has been expressly stated, for example, in the DE-OS 26 15 638 (cf. claim 4 in combination with page 4, penultimate paragraph). Moreover, most of the processes require a high acid concentration in the extracting solutions, which in practice is normally achieved by increasing the $H_2SO_4$ concentration in the electrolyte to about 500 g/l from the level of 100 to 250 g/l used for electrolytic refining. At such high sulfuric acid concentrations the organophosphorus compounds do not only extract the contaminant elements from the solutions, but also significant amounts of sulfuric acid are transferred into the organic phase. This requires the use of several washing steps, wherein the extracted sulfuric acid must be recovered and recycled into the process. Moreover, the organophosphorus extractants, particularly TBP, are not fully stable at such high acid strengths and, thus, the efficiency of use of these materials is reduced. In addition, in all of the mentioned processes, a so-called modifier, in most cases isodecanol, must be added to the extracting agent for improving the separation of the organic phase from the inorganic phase, and this modifier may possibly even accelerate the decomposition of the extractant.

Furthermore, all of the processes are disadvantageous with respect to the recovery of the contaminant elements, following the extraction of the contaminant elements from the organic phase. Thus, according to DE-OS 26 14 341 and DE-OS 26 15 638, arsenic is removed from the organic phase with aqueous alkali solutions. Thereby, however, arsenic is extracted in a mixture of the oxidation states (III) and (V). In order to be able to obtain $As_2O_3$, the desired final product, the pentavalent arsenic will additionally have to be reduced prior to or during the re-extraction, usually by use of $SO_2$. This requires a further process step including additional equipment and chemicals. Hydrochloric acid and other mineral acids are used for the re-extraction of the arsenic according to the EP-A-0 106 118. Only by strict control of the chloride content in the re-extraction can Cl be prevented from getting into the refining electrolyte and adversely affecting the refining of copper. Multistage circulation systems are required in practice to avoid this chloride contamination.

The difficulties noted above by way of example in removal of contaminant elements from copper electrolyte solutions are of course encountered in a similar manner with contaminations by unwanted elements in aqueous solutions of other primary metals such as, e.g., zinc or nickel. In the individual case, particular importance may be attached to the separation of a definite contaminant element or group of such elements.

An example of this type has been described in U.S. Pat. No. 4,834,951 of May 30, 1989 to Schwab et al., which teaches a process for the joint removal of arsenic, antimony, bismuth, and iron in combination from electrolyte solutions of primary metals by way of a solvent extraction and subsequent recovery of these contaminant elements. In this process aqueous mineral acid electrolyte solutions of primary metals are mixed with a sparingly water-soluble organic solvent containing one or more hydroxamic acid(s), the two phases are thoroughly contacted with each other and then separated, the contaminant elements arsenic, antimony, and bismuth are precipitated from the organic phase by sulfide precipitation, the sulfides are separated off, and the iron, having remained in the organic phase, is subsequently re-extracted into an aqueous phase by means of a complexant for iron and recovered therefrom.

In this process, the recovery of the contaminant elements from the loaded organic phase is effected by sulfide precipitation, whereupon the contaminant elements are obtained as sulfide filter cake. This filter cake usually consists of the components arsenic sulfide, antimony sulfide, and bismuth sulfide, all of which have to be laboriously separated and re-processed for any economical further use.

Other processes for selectively extracting metal ions from aqueous solutions by means of a hydroxamic acid dissolved in an organic solvent have been known from prior art. In DE-PS 22 10 106, transition metals are extracted from partially radioactive aqueous solutions from reprocessing plants by using a hydroxamic acid having the general formula (A):

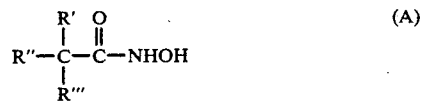

wherein each of the symbols R', R", and R'" represents an alkyl radical.

According to U.S. Pat. No. 3,464,784, vanadium is extracted from aqueous solutions containing tetravalent vanadium by means of organo-soluble hydroxamic acids having the general formula (B):

wherein R represents alkyl, cycloalkyl, or aryl radicals having from 7 to 44 carbon atoms, and preferably so-called "neo-alkyl" radicals which have a quaternary carbon atom adjacent to the carbonyl group. In *J. Chem. Research* (S) 1982, 90 et sec., there has also been described the solvent extraction of transition metals with so-called versatohydroxamic acids having the general formula (B) wherein the residues R represent branched alkyl radicals containing from 10 to 15 carbon atoms. The solvent extraction of various metal isotopes from aqueous solutions derived from reprocessing plants for radioactive waste by using trialkylacethydroxamic acid has been described in *Reprints of the ISEC '86*, Sep. 11–16, 1986. Munich, pp. 355-362".

It is a major object of the present invention, in view of the above described prior art, to provide a process for the removal of contaminant elements from electrolyte solutions of primary metals and the subsequent recovery of said contaminant elements for further utilization, which process allows the contaminant elements arsenic (As), antimony (Sb), bismuth (Bi), and/or iron (Fe), and more especially the main contaminant arsenic, to be removed; and wherein reduced amounts of the precipitant hydrogen sulfides are employed. In addition, by means of the process according to the invention, ions of individual contaminant elements can be selectively removed, while in the case of arsenic ions even As (III) ions or As (V) ions can be selectively removed. Finally, said selective separation of contaminant elements allows the contaminant elements to be obtained in a form such as to be readily further processable.

DESCRIPTION OF THE INVENTION

In this description, except in specific examples or where otherwise expressly indicated to the contrary, all numbers specifying amounts of materials or conditions of reaction or use are to be understood as modified by the term "about".

It has surprisingly been found that a selective re-extraction of the contaminant elements arsenic and/or antimony from the organic phase can be accomplished by the use of water, if certain process parameters such as temperature, residence time, ratio by volume of organic/aqueous phases, and pH value are accurately maintained at definite levels.

The invention includes a process for the removal of at least one of the contaminant elements arsenic, antimony, and bismuth, and optionally also iron, from electrolyte solutions of primary metals by liquid phase extraction and subsequent recovery of the contaminant elements, comprising the steps of:

(a) mixing an aqueous mineral acid containing electrolyte solution of primary metal and at least one contaminant element with a sparingly water soluble organic solvent containing dissolved hydroxamic acid molecules according to the general formula (I):

$$R^1-\underset{\underset{\|}{O}}{C}-NHOH, \quad (I)$$

wherein $R^1$ represents a straight chain or branched saturated or unsaturated acyclic monovalent aliphatic hydrocarbon moiety containing from 6 to 22 carbon atoms, or a totally or partially cyclic saturated or unsaturated, including totally or partly aryl, hydrocarbon moiety having from 5 to 19 carbon atoms; said mixing being for a sufficient time to cause transfer of at least part of the content of contaminant element or elements from the electrolyte solution to the organic solvent phase, so as to produce an organic phase enriched in contaminant element content;

(b) separating the mixed phases from step (a);

(c) mixing the separated enriched organic liquid phase from step (b) with an aqueous extractant liquid phase for a sufficient time to cause transfer of at least part of its contaminant element content from the organic liquid phase to the aqueous extractant liquid phase, so as to produce an intermediately enriched organic liquid phase having a contaminant element content lower than at the end of step (b) but higher than at the beginning of step (a) and an aqueous extractant phase enriched in contaminant element content;

(d) separating the enriched aqueous extractant phase from the intermediately enriched organic liquid phase present at the end of step (c); and (e) mixing the intermediately enriched organic liquid phase from step (c) with a source of sulfide ions so as to precipitate at least part of the contaminant element content thereof as solid sulfides and produce a depleted organic liquid phase.

Optionally, a process according to the invention may also include any or all of the following additional steps:

(f) extracting residual iron content from the organic liquid phase produced at the end of step (d) or step (e);

(g) further processing the organic liquid phase obtained at the end of step (d) or (e), by means known in the art, to make the organic solvent content thereof suitable for recycle to step (a); and (h) further processing any liquid or solid contaminant element containing phases obtained in any of the preceding steps, by means known in the art, such as hydrometallurgical and pyrometallurgical processes, to recover the contaminant element(s) therefrom in more economically valuable form.

As will be apparent to those skilled in the art from the description above, a process according to the invention falls under the generic term of "liquid-liquid extractions". This term is conventionally understood to mean processes wherein two liquid, substantially mutually immiscible or insoluble, phases are brought into intimate contact with each other, whereby a transfer of one or more component(s) from the one phase into the other phase occurs. In the course of such a process, an equilibrium is established which depends on various external parameters. Such parameters will be described below in more detail for the individual process steps.

The term "contaminant element(s)" as used herein in the description and claims is understood to mean any or all of the elements arsenic, antimony, bismuth, and iron which —depending on the raw materials and smelting processes used—are present in higher or lower, but in any event undesired, concentrations, in electrolyte solutions which according to the invention may be rid of said elements. Within the scope of the process, one or more of said element(s) may be present in different oxidation numbers. Thus, for example, the contaminant element arsenic may be present with an oxidation number of (III) or an oxidation number of (V) in these aqueous solutions.

According to the invention it is preferred to remove the above-identified contaminant elements from aqueous solutions derived from the process of the copper-refining electrolysis, wherein the element arsenic in general is the major component of the mixture of contaminant elements. However, the process according to the invention is not restricted to a removal of contaminant elements from such solutions. It is also possible to remove one or several of said contaminant elements or all four of them from aqueous solutions containing copper, zinc, nickel, or other primary metals derived from other sources or obtained in other processes.

The first step of a process according to this invention consists of mixing aqueous mineral acid electrolyte solutions of primary metals with a sparingly soluble organic solvent or extracting agent containing one or more hydroxamic acid(s) having the general formula (I) as already described above. Suitable chemically inert organic solvents which are sparingly miscible with or soluble in water include, e.g., aliphatic, cycloaliphatic, or aromatic hydrocarbons or mixtures thereof having sufficiently low volatility for practical use, chlorinated hydrocarbons, and ketones or ethers having sufficiently low volatility, and also include mixtures of any of these compounds as well. Petroleum derived kerosene(s) or mixtures thereof are preferred for the organic liquids to be used in this invention, as known from prior art.

By way of example, the $R^1$ group in formula I for the hydroxamic acid used in a process according to this invention may be hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, or docosyl, or branched isomers of any of these groups. In a similar manner unsaturated alkyl radicals which may also be straight chain or branched may be present in the place of such saturated radicals.

Preferred hydroxamic acid(s) have formulas in which $R^1$ represents branched saturated alkyl radicals containing from 6 to 22 carbon atoms, and more preferably branched saturated alkyl radicals containing from 7 to 19 carbon atoms. Still more preferably, the $R^1$ group should be a neoalkyl radical having the general formula II:

$$R^2-\overset{R^1}{\underset{R^3}{C}}-, \qquad (II)$$

wherein each of $R^1$, $R^2$, and $R^3$ represents a monovalent saturated linear or branched aliphatic hydrocarbon moiety and the sum of the numbers of the carbon atoms of the groups $R^1$, $R^2$, and $R^3$ is within the range of from 6 to 18. Thus, within this highly preferred category, $R^1$ may be, for example, any one of the various isomeric radicals from the group of neo-heptyl, neo-octyl, neo-nonyl, neo-decyl, neoundecyl, neo-dodecyl, neo-tridecyl, neo-tetradecyl, neopentadecyl, neo-hexadecyl, neo-heptadecyl, neo-octadecyl, and neo-nonadecyl. In this context, the individual meanings of the groups $R^1$, $R^2$, and $R^3$ is of minor importance, as long as each of them has at least one carbon atom. Such neo-alkyl groups promote optimum solubility and stability of the hydroxamic acids having the general formula I and used as extractants in the organic solvent.

The hydroxamic acids having the general formula I usable in the process according to the invention can be prepared in accordance with processes generally known in the art. Thus, for example, according to the DE-PS 22 10 106 the respective carboxylic acid can be converted into the corresponding acid chloride with an excess of $SO_2Cl_2$, and the acid chloride in turn can be reacted with hydroxylamine to form the hydroxamic acid of the general formula I. According to J. Chem. Research (S) 1982, 90, the reaction of the carboxylic acid to form a corresponding alkyl ester and its subsequent reaction with hydroxylamine to form the corresponding hydroxamic acid of the general formula (I) is also possible. Other processes known from prior art for the preparation of such compounds may be applied as well.

For a process according to the invention for removing arsenic, antimony, bismuth, and iron from sulfuric acid electrolyte solutions of primary metals, the most highly preferred hydroxamic acids are one of two commercial products obtainable from Shell Chemical Corporation under the trade mark Versatic Acid ®. These products are comprised of a commercial mixture of hydroxamic acids, all conforming to general formula I with $R^1$ conforming to general formula II, but having varying chain lengths for $R^1$, $R^2$, and $R^3$. In one case they contain neo-alkyl radicals of the general formula II wherein the sum of the numbers of the carbon atoms of the residues $R^1$, $R^2$ and $R^3$ is 8, and in the other case they contain neo-alkyl radicals of the general formula II wherein the sums of the numbers of the carbon atoms of the residues $R^1$, $R^2$ and $R^3$ are within the range of from 7 to 17. These two products, when used as extraction reagent in a process according to the invention, have excellent solubility in the organic phase and also can be reversibly charged to an optimum degree with the above-identified contaminant elements. Moreover, such hydroxamic acids are extremely stable in the pH ranges conventional in such electrolyte solutions of primary metals and do not extract any significant free mineral acid either at room temperature or elevated temperatures. Specifically, these hydroxamic acids do not extract any detectable sulfuric acid from copper electrolyte solutions. Moreover, organic phases containing such hydroxamic acids have viscosities within such a range that an optimum separation of the phases is facilitated after the mixing operation discussed below. Thus, potential problems in the separation of the organic phase from the aqueous phase are avoided.

Part of a process according to this invention consists of thoroughly mixing the aqueous phase and the organic phase with each other for a sufficient period of contacting time. The time of contacting the two phases with each other is one of the process conditions which controls the amount of the contaminant elements extracted, and more specifically the amount of arsenic extracted. At a predetermined reagent concentration which in detail will be indicated below, the major amount of the contaminant elements antimony, bismuth, and iron is substantially extracted after 3-5 minutes of contact. However, the relative amount of arsenic extracted within that time is distinctly lower. This phenomenon is due to the fact that in typical electrolyte solutions, and more specifically those used for electrolytic copper-refining, the compositions of which are subject to variations with quality and preparation of the crude copper anode, there are contained only relatively low amounts of antimony, bismuth, and iron, about 0.1 to 0.6 g/l, while the amounts or arsenic normally are much higher, from about 8 to in excess of 20 g/l.

If as much as possible of arsenic is to be extracted—as is usually desired—then the contact time should be appropriately prolonged and/or the extractant concentration in the organic phase should be appropriately increased. For the utilization of the maximum extraction capacity of the hydroxamic acids of the general formula (I), the aqueous and the organic phases should preferably be thoroughly mixed with each other over a period of from 1 to 60 minutes, and particularly preferably for a period of from 10 to 20 minutes. Within this period of time, a large part of the arsenic contained in the copper electrolyte solutions will have been transferred into the organic phase.

A further important processing condition influencing the amount of the contaminant elements extracted is the concentration of the hydroxamic acids of the general formula I or mixtures thereof. The amount of extractant in the organic phase is limited by the fact that at high concentrations of the hydroxamic acids in the organic phase, when this phase becomes enriched in (alternatively described as "loaded with") the contaminant elements, the viscosity increases so much that in a continuous mode of operation an efficient mutual mixing of the two phases can no longer be ensured. In addition, as has been noted above, the separation from the aqueous phase of the organic phase is rendered substantially more difficult with increasing viscosity. Therefore, it is preferred, in a process according to the invention, to use organic solvents such as kerosene or mixtures thereof which contain hydroxamic acid(s) in a concentration in the organic phase of from 0.1 to 2.0 moles per liter ("moles/l"), and preferably in a concentration in the organic phase of from 0.5 to 1.0 moles/l.

The temperature at which the two phases are contacted with each other is preferably within the range of from 20° C. to 70° C., and more preferably within the range of from 30° C. to 60° C. Electrolyte solutions withdrawn from the mixing step normally have temperatures within the range of from 50° C. to 70° C., in part because the process operation generates heat. Thus, in a continuous mode of operation it is not required to separately heat the mixtures in the mixing vessel. At a temperature within said range both phases are intensely mixed with each other. This may be accomplished, for example, in a continuous mode of operation by using a so-called "mixer-settler" where the two phases are mixed with each other at the indicated temperature for the period of time as indicated, and then the phases are allowed to become separated in the settler.

In a following process step, the organic phase containing hydroxamic acid(s) and the extracted contaminant elements arsenic, antimony, bismuth, and iron is withdrawn from the aqueous phase. Then the organic phase loaded with contaminant elements is re-extracted with water for a sufficient period of contacting time. A re-extraction of the contaminant element arsenic into the aqueous phase is achieved even when this process step is carried out just one time. The process conditions in this step depend on the oxidation number and amount of the arsenic present in the organic phase. For example, As (III) ions are more rapidly re-extracted into the aqueous phase than are As (V) ions. This will be illustrated by Examples hereinbelow.

The contacting time influences the distribution of the contaminant metals between the organic and the aqueous phases. A period of from 1 to 20 minutes, and preferably of from 10 to 15 minutes, has proven to be a sufficient period of contact during which the two phases are mixed with each other for this re-extraction stage. The temperature at which the two phases should be maintained in contact with each other is preferably within the range of from 20° C. to 80° C., and more preferably from 50° C. to 70° C. The ratio by volume of the organic phase to the water phase added should be adjusted so as to obtain adequate extraction while minimizing the volume of water as much as possible, thereby obtaining an aqueous phase having a content of contaminant metals which can be worked up without a preceding step of concentrating the aqueous phase. Quantitatively, it is preferred to use from 5 to 2,000 parts by volume of water to 100 parts by volume of the organic phase.

By adjusting the pH from a weakly acidic to a strongly acidic value, it is possible to transfer part of the major contaminant element arsenic either in combination with or substantially free from antimony into the water phase. Specifically, at a pH value of from 0 to 3, and preferably of from 1.5 to 3, upon re-extraction there is obtained an aqueous solution which contains arsenic ions but nearly excludes any of the other contaminant elements present in the organic phase. If the arsenic is present as arsenic (III) ions, direct precipitation to form arsenic trioxide may be effected, after a preceding step of concentrating the solution if needed. If, however, As (V) ions are re-extracted into the aqueous phase, a reduction will be required prior to precipitation.

At a pH value of from >3 to 6, and preferably of from 4 to 6, upon re-extraction there is obtained in the aqueous phase a metal ion mixture which contains arsenic as the major component and antimony as a minor component.

In another process step, the contaminant metal re-extracted into the aqueous phase, if desired or required, is reductively precipitated in a manner known per se and worked-up as a by-product. In the case of strongly acidic solutions containing arsenic (V) ions as described above, this is done by the addition of a reducing agent, for example sulfur dioxide or hydrogen sulfide. The pure precipitate obtained thereby, comprising arsenic trioxide or arsenic trisulfide, may be further processed in a manner known per se.

In the case of the acidic aqueous solutions which contains arsenic as the major component and antimony as a minor component, the components first have to be separated from one another in a manner known per se and than to be further processed to form arsenic and antimony components, respectively. The elements arsenic and antimony are of particular interest for special technical applications, for example for the electronics industry.

Another step of a process according to the invention consists of admixing the organic phase with a sulfide ion source. This process step is important in the process according to the invention, because the extraction of the contaminant elements from the electrolyte solutions of the primary metals is carried out at very high concentrations of mineral acid, e.g., from 150 to 250 g/l of $H_2SO_4$. Thus, an increase in the acid concentration, conventionally performed as part of the re-extraction of contaminant elements, is inapplicable for a removal of the contaminant elements from those highly acidic solutions. Also, a re-extraction of the contaminant elements by treating the organic phase with alkaline solutions cannot be satisfactorily used, because the hydroxamic acids having the general formula (I) are not sufficiently stable, particularly in the more strongly alkaline range. The sulfide precipitation of the contaminant elements, directly feasible with the loaded organic phase according to the process of the present invention, in a simple and surprising manner avoids the need for any re-extraction from the organic phase of the contaminant elements by way of a treatment with strongly acidic or strongly alkaline aqueous solutions.

In a process according to the invention, suitable sulfide ion sources are hydrogen sulfide ($H_2S$) gas and/or anhydrous sodium sulfide or sodium hydrogensulfide. Hydrogen sulfide is preferred. It is particularly well suited for the precipitating step, since it simultaneously exerts two functions: $H_2S$, on the one hand, acts as a reagent for precipitating arsenic, antimony, and bismuth from the organic phase while, on the other hand, it regenerates, due to its "acidic properties", the hydroxamic acid(s) having the general formula (I).

In the application of the direct sulfide precipitation from the organic phase with the use of hydrogen sulfide, important controlling process conditions are the hydrogen sulfide pressure, the temperature during the precipitation process and the time of reaction. These conditions may be varied within wide margins. The addition of a stoichiometric amount or a slightly more than stoichiometric amount of gaseous hydrogen sulfide is sufficient for the precipitation of the sulfides of the contaminant elements. Precipitation is preferably accomplished by introducing $H_2S$ in the amount previously calculated from the amounts of contaminant elements present in the electrolyte and agitating the reaction system with an inert gas, e.g. $N_2$. However, it is also possible to adjust the $H_2S$ pressure in the course of the precipitation process to a value of from 0.1 to 50 bar, and preferably to a value within the range of from 0.5 to 1 bar. More particularly, an elevated $H_2S$ pressure favors the precipitation of the arsenic sulfides. Upon application of a low elevated pressure (1 to 3 bar), the precipitation reaction can be carried out in a suitable glass vessel; thus, the use of expensive metal autoclaves is not necessary. However, if it is intended to operate at higher pressures (4 bar and higher), it is generally required to use an autoclave. However, it is advantageous that the use of highly corrosion resistant and, thus, expensive autoclave materials (e.g. Hastelloy steels) is not necessary; autoclaves of conventional steels (for example V4A steels) can be used for a process according to this invention.

The completeness of the precipitation is also affected by the temperature. At higher reaction temperatures, which preferably are in the range between 40° and 90° C., the range between 60° C. and 80° C. being particularly preferred, a complete precipitation of the sulfides of the contaminant elements arsenic, antimony and bismuth from the organic phase is accomplished.

The reaction time is also important for the completeness of the precipitation and substantially corresponds to the residence time of the organic phase in the reaction vessel during the introduction of $H_2S$. The reaction time should be adjusted to suit the other conditions mentioned and in preferred embodiments of the process according to the invention is from 1 to 60 minutes, more preferably 5 to 20 minutes.

An effective adjustment of all the mutually interacting conditions of the sulfidization reaction may be achieved by a few simple tests. In carrying out the process according to the invention, operating the precipitation at a temperature of the loaded organic phase of 80° C. by introducing hydrogen sulfide at an $H_2S$ pressure of 0.5 bar for a reaction time of 15 minutes has proven to be particularly useful. Under these reaction conditions, 100% of the contaminant elements antimony and bismuth are precipitated along with at least 80% of the arsenic. For achieving a complete precipitation of arsenic, a further increase in pressure over this particularly preferred range or a longer reaction time may be required.

After completion of the precipitation, the precipitates may be separated from the organic phase in a manner known per se in another process step. This is conventionally achieved by filtering the organic phase through a filter of a suitable size or by centrifuging. Nevertheless, it is also possible to allow the sulfide precipitates of arsenic, antimony, and bismuth to settle in the reaction medium and to decant the supernatant organic phase. Which particular route is chosen will depend on the consistency of the sulfide precipitates formed and on further process conditions and is without any critical influence on the completion of the recovery of the contaminant elements. In order to free the precipitated sulfides from residues of organic components, it is possible to wash said sulfides with any optional organic solvent, for example with hydrocarbons of the type as set forth above or also with other solvents suitable for such washing purposes such as acetone, volatile esters, or the like. Thereby, a complete removal of organic component from the filter cake may be accomplished.

Moreover, with respect to the subsequent removal of the iron out of the organic phase, it is desirable to the maximum practical extent to remove from the organic phase the total amount of $H_2S$ dissolved therein. Preferably, the organic phase obtained after the sulfide precipitation is exhaustively purged with an inert gas by blowing same therethrough. Thereby, dissolved or excessive residual amounts of $H_2S$ are completely stripped. It is possible to perform this washing step in a continuous operation mode by circulating the mineral acid employed and using it in the purification step of subsequent batches.

As has already been mentioned above, the iron transferred into the organic phase from the electrolyte solution of the primary metal(s) by one or more of the hydroxamic acid(s) (I) will not be precipitated under the conditions as defined in detail above. A re-extraction of the iron by treating the organic phase with basic aqueous solutions, without losing a large portion of the hydroxamic acids, is not feasible because of their low stability to bases.

If a separation of the iron from the organic phase is desired, this is accomplished in another step of a process according to the invention, after the removal of the other contaminant elements as sulfides and the removal of the excess of hydrogen sulfide, by mixing the organic phase directly with a water-soluble complexant for iron or with an aqueous solution of such a complexant. Preferred as water-soluble complex-forming agents for iron are compounds from the group of hydrogen chloride, oxalic acid, or phosphorus containing organic acids, more particularly hydroxyethanediphosphonic acid (HEDP). These complexants are known to have a high affinity to iron. Among these, oxalic acid or hydrogen chloride are particularly preferred.

The separation of iron as inorganic chloro-complex or oxalate or phosphonate, respectively, is dependent on the concentration of the complexant in the organic phase or—if aqueous solutions of the complexant are used—in the aqueous phase, the time of treatment of the organic phase with the complexant or its aqueous solution, and the reaction temperature; as has already been indicated above, said process conditions are also mutually interrelated. In practice it has been shown that the concentration of the water-soluble complex-forming agent for iron in the organic phase or in the aqueous phase advantageously may amount to values of from 0.1 to 2 moles/l of the complexant, and preferably to a concentration of 0.5 to 1 moles/l of the complexant. In a continuous mode of operation of the ironcomplexing step, which is preferably carried out in a mixer-settler, contacting times of from 1 to 20 minutes, and preferably from in excess of 5 to 15 minutes, are required at those complexant concentrations. These periods of treatment apply to carrying-out the complexing step at room temperature and may be appropriately reduced, if the temperature is raised. It is particularly preferred to treat the organic phase with 1 mole of oxalic acid or of HEDP per 1 liter of organic phase or aqueous phase through a contacting period of 15 minutes in a mixer-settler. Through such a treatment, in an organic phase which had passed the step of sulfide precipitation and which thereafter contained 0.6 g/l of iron, the iron content could be reduced to 0.07 g/l, i.e. by almost 90%.

If the complexant is directly added to the organic phase, the iron complex formed via the route described above may be, in still another process step, re-extracted with water from the organic phase in a manner known per se. To this end, the organic phase is brought into intimate contact with a sufficient amount of water that, because of the good water-solubility of the iron complex, a complete transfer into the aqueous phase is obtained. After the addition of aqueous solutions of complexant, these, upon intimate mixing with and subsequent separation from the organic phase, contain almost all of the iron extracted from the electrolyte solutions. From this aqueous phase, the iron may be recovered by methods known per se, if desired.

If hydrogen chloride is used as the water-soluble complexant for iron, the iron contained in the organic phase is completely converted into an inorganic chlorocomplex. In order to enable a recycling of the organic phase and the hydroxamic acids contained therein, the organic phase must be largely, if not completely, freed from hydrogen chloride and/or free chloride ions. To this end, upon conversion of the iron dissolved in the organic phase into the anionic complex form by the addition of a sufficient amount of hydrogen chloride, the organic phase is again extracted with a secondary amine as a liquid ion exchanger, for example with the ion exchanger obtainable under the trade name of "Amberlite, LA2". The iron thus extracted may be subsequently re-extracted with water. Then the organic phase is washed with water until chloride-free to render it and the hydroxamic acids contained therein reusable in the extraction cycle. One or two steps of washing with water result in a reduction of the chloride content in the organic phase to below 50 ppm, or with careful control of the amount of introduced hydrogen chloride, even to below 30 ppm. It is preferred to reduce the chloride content in the organic phase to a few ppm. The resulting organic phase containing the hydroxamic acid(s) can subsequently be directly re-used for the extraction of the contaminant elements.

The separation of iron may be effected, apart from the addition of gaseous hydrogen chloride, also by treating the organic phase with aqueous hydrogen chloride (hydrochloric acid). In practice the use of a 1- to 12-molar HCl, preferably of a 3- to 8- molar HCl, has proven to be effective. The concentration and amount of aqueous hydrogen chloride used must be such that the concentration of chloride ions in the organic phase after extraction is completed is from 0.1 to 2 moles/l of the organic phase. Thereby it is ensured that all of the iron is converted into the form of an inorganic chloro complex. The latter is then, after the addition of water, separated with the aqueous inorganic phase from the organic phase and contains all of the iron previously extracted with the organic phase.

Also in this case it has been proven to be particularly advantageous that the hydroxamic acids of the general formula (I) do not extract any significant amount of free hydrochloric acid (similar to what has been indicated above with reference to $H_2SO_4$). Moreover, due to the re-extraction of the iron in the form of a chloro complex, no sparingly water soluble chloride salts, which would not be readily removable by treating the organic phase with water, are formed during the process.

Fundamentally, the process step of complexing iron could be included in the step of precipitating the contaminant elements arsenic, antimony, and bismuth as sulfides from the loaded organic phase. In this case, the respective re-extracting agents would have to be placed, together with the organic phase, in the precipitation vessel, which in the case of operating under elevated pressure may be an autoclave. Then, the reaction of precipitating the elements arsenic, antimony, and bismuth would proceed in the same way as described above for that separation alone. The elements arsenic, antimony, and bismuth are precipitated as sparingly soluble sulfides, and in this case the iron is simultaneously transferred into the re-extraction medium used (aqueous complex-forming phase). However, if hydrogen chloride were used as the re-extraction medium, it would be necessary, apart from what has been described hereinabove for the separate work-up of the iron complexes, to use an anti-corrosive autoclave material, since hydrogen chloride will attack less corrosion-resistant steels.

In a similar manner, the process step of re-extracting the iron may also be designed to take place prior to the sulfide precipitation. For example, if aqueous HCl is employed as the complexant for iron, the re-extracted iron phase will additionally contain antimony and also small amounts of arsenic. This means that from the recovered aqueous chloridic phase the iron cannot be readily re-extracted, i.e. without preceding removal of antimony and arsenic. For this reason, the mode of operation described first is preferred, that is the sequence of sulfide precipitation, removal of sulfides, subsequent or joint extraction of iron and/or iron re-extraction.

In another step of the process according to the invention, the aqueous phase left after the removal of the contaminant elements is worked up in a manner known per se. The work-up may consist of, e.g. in the case of copper electrolyte solutions arising from some types of ores employed in copper smelting, removing further contaminant elements, for example nickel. In addition, strict attention should be paid to assure that the resultant organic phase substantially consists only of the employed solvents or extracting agents and the extractants, i.e. one or more of the above-mentioned hydroxamic acids having the general formula (I). Then, such an organic phase is directly suitable for re-use in the extraction cycle. If desired or required, it may be topped up with the required amount of extractant, i.e. one or more of the above-mentioned hydroxamic acids having the general formula (I), and is then immediately recycled into the extraction step. Said procedure may be continuously operated by permanently withdrawing a fixed amount of the copper-refining electrolyte solution from the electrolytic device and subjecting it to the partial process steps described above. However, it is equally suitable to discontinuously operate the process and to withdraw the amounts of the copper-refining electrolyte solution in small partial amounts and to collect the organic phase loaded with the contaminant elements in a tank. Then the collected amounts of loaded organic phase are jointly subjected to the precipitation and re-extraction steps described above.

The invention is further illustrated by the following non-limiting Examples.

EXAMPLE 1

By means of the process according to the invention, the extraction of the contaminant elements from a solution sampled from an industrial copper refining electrolysis process was continuously carried out in a mixer-settler. Only a one-step extraction was required for the electrolyte solution tested, which contained, in g/l, 12.0 As; 0.030 Bi; 0.52 Sb; 0.30 Fe; 45 Cu; 10 Ni, and 160 $H_2SO_4$.

The kerosene commercially available from Esso Chemical Co. under the name of "Escaid ® 100" was used as the organic solvent and predominant component of the extracting medium.

The hydroxamic acids used had been prepared from a mixture of carboxylic acids of the formula

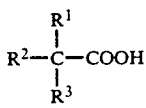

wherein the sum of the number of the carbon atoms of the substituents $R^1$, $R^2$ and $R^3$ was within the range between 7 and 17. Such a mixture of neoalkyl acids is commercially available as Versatic ® 1019 from Shell Chemical Co. The concentration in the organic phase of the extractant was 0.5 moles/l.

After extraction of the electrolyte, the organic phase comprised the following concentrations of contaminant metals (in g/l): 6.5 As; 0.52 Sb; 0.03 Bi and 0.30 Fe.

In a one-step shaking experiment with a volume ratio of 1:1, a re-extraction of the four contaminant elements As, Sb, Bi, and Fe was carried out with water at various temperatures, residence times, and pH values as set forth in Table 1.

TABLE 1

| Temp. (°C.) | Residence Time (min) | pH (measured after Re-extraction) | Percent Re-extraction As | Sb | Bi | Fe |
|---|---|---|---|---|---|---|
| 20 | 60 | 2.3 | 10 | 3 | 0 | 0 |
| 60 | 10 | — | 12 | 2 | 0 | 0 |
| 60 | 20 | — | 25 | 0 | 0 | 0 |
| 60 | 30 | — | 27 | 0 | 0 | 0 |
| 60 | 60 | 2.0 | 32 | 3 | 0 | 0 |
| 80 | 5 | 2.0 | 23 | 4 | 0 | 0 |
| 80 | 10 | 1.9 | 35 | 3 | 0 | 0 |
| 80 | 20 | 1.9 | 40 | 3 | 0 | 0 |
| 80 | 30 | 1.9 | 40 | 3 | 0 | 0 |
| | | adjusted with NaOH | | | | |
| 80 | 10 | 3.0 | 43 | 5 | 0 | 0 |
| 80 | 10 | 4.0 | 45 | 32 | 0 | 0 |
| 80 | 10 | 5.0 | 36 | 32 | 0 | 0 |
| 80 | 10 | 6.0 | 21 | 37 | 0 | 0 |

The results in Table 1 show that arsenic and antimony, after separation of the organic phase from the aqueous electrolyte phase, were partially transferred into an aqueous phase by re-extracting the organic phase with a water phase. In a strongly acidic medium (pH 1.9 to 4.0), up to 45% by weight of the major contaminant element arsenic was re-extracted, and in a weakly acidic medium, adjusted with base to give a pH from 4 to 6, up to 37% by weight of antimony was re-extracted in addition to part of the major contaminant element arsenic.

EXAMPLE 2

The same electrolyte solution and initial extraction as in Example 1 were used; then the organic phase obtained after the extraction was subjected to a multi-step re-extraction with the same volume of fresh water at a temperature of 80° C., each step taking 15 minutes. The results obtained are shown in Table 2.

TABLE 2

| Step | pH (after Re-extraction) | Percent Re-extraction As | Sb | Bi | Fe |
|---|---|---|---|---|---|
| 1 | 1.9 | 35 | 2 | 0 | 0 |
| 2 | 2.0 | 49 | 2 | 0 | 0 |
| 3 | 2.1 | 60 | 6 | 0 | 0 |
| 4 | 2.4 | 63 | 6 | 0 | 0 |
| 5 | 2.6 | 66 | 4 | 0 | 0 |

EXAMPLE 3

The same electrolyte solution and initial extraction as in Examples 1 and 2 were used; then the re-extraction isotherm was determined by re-extraction with water at 80° C. and a residence time of 15 minutes at varying ratios by volume of organic phase:aqueous phase. The results are shown in Table 3.

TABLE 3

| Ratio O/A | Contents in Org. Phase (g/l) | | | | Contents in Aq. Phase (g/l) | | | |
|---|---|---|---|---|---|---|---|---|
| | As | Sb | Bi | Fe | As | Sb | Bi | Fe |
| 1:5 | 3.1 | 0.51 | 0.029 | 0.30 | 0.2 | 0.0077 | <0.002 | <0.001 |
| 1:3 | 3.5 | 0.51 | 0.029 | 0.31 | 0.7 | 0.017 | <0.002 | <0.001 |
| 1:1 | 4.1 | 0.52 | 0.030 | 0.31 | 3.0 | 0.019 | <0.002 | <0.001 |
| 3:1 | 4.9 | 0.51 | 0.030 | 0.30 | 6.0 | 0.033 | <0.002 | <0.001 |
| 5:1 | 5.4 | 0.52 | 0.030 | 0.30 | 7.9 | 0.058 | <0.002 | <0.001 |
| 10:1 | 5.6 | 0.51 | 0.030 | 0.30 | 12.0 | 0.087 | <0.002 | <0.001 |
| 20:1 | 5.9 | 0.51 | 0.030 | 0.30 | 18.0 | 0.1880 | <0.002 | <0.001 |

EXAMPLE 4

An organic extractant phase like that in Example 1, but loaded with slightly different concentrations of contaminant elements as shown below, was re-extracted with water and thereafter subjected to a sulfide precipitation by means of $H_2S$.

a) Loaded Organic Phase

The extractant concentration was 0.5 moles/l.
Sb: 0.3 g/l
Bi: 0.1 g/l
As: 7.3 g/l b) Re-extraction with Water A volume of 1100 ml of the above-identified loaded organic phase were stirred with 1100 ml of distilled water at 60° C. for 15 minutes (Ratio O/A 1:1; one-step procedure). After phase separation the two phases were analyzed, with the following results:

| Organic Phase | Aqueous Phase |
|---|---|
| Sb: 0.3 g/l | — |
| Bi: 0.1 g/l | |
| As: 5.0 g/l | As: 2.3 g/l |

The pH value of the aqueous phase was 1.9.

c) Sulfide Precipitation with $H_2S$

The organic phase resulting after the re-extraction with water was charged into a closed vessel. Nitrogen was used as inert gas. The reaction conditions were as follows: Temperature 60° C.: $H_2S$ pressure 0.5 bar: reaction time 5 minutes; vigorous mixing during the introduction. The mixture was subsequently purged with nitrogen for about 30 minutes to remove any residual dissolved $H_2S$.

Contents in the organic phase after sulfide precipitation:
Sb: 0.04 g/l
Bi: <0.1 g/l
As: 4.5 g/l After an extended time of reaction (15 minutes) or the same reaction time, but with an elevated temperature (80° C.), arsenic could be removed to a level of 1.5 g/l in the organic phase. This residual amount may be completely precipitated, if required or desired, upon application of an elevated pressure as described in U.S. Pat. No. 4,834,951.

EXAMPLE 5

The following experiments demonstrate why the re-extraction with water of As (III) is preferred over the re-extraction of As (V).

As the extractant there was used a 0.5-molar solution of hydroxamic acid as described in Example 1. The aqueous electrolyte solution employed was a synthetic $H_3AsO_4$ solution in sulfuric acid (150 g/l of $H_2SO_4$). The As (V) content concentration was 10 g/l. After loading (Ratio O/A: 1:1; 60 minutes at room temperature) there resulted an organic phase comprising 6.8 g/l of As (V).

The following re-extraction experiments were carried out at a ratio O/A of 1:1 at 60° C. with stirring (one step).

| | Results | |
|---|---|---|
| Duration (minutes) | As(V) Content in Organ. Phase (g/l) | Percent Re-extraction of As(V) |
| 10 | 5.8 | 15 |
| 30 | 5.1 | 25 |
| 60 | 5.1 | 25 |

In comparison, the re-extraction with water of As (III) was investigated with a loaded organic phase having the extractant and solvent as mentioned above and 6.4 g/l of As (III).

The aqueous electrolyte solution employed was a solution of $As_2O_3$ and 150 g/l of sulfuric acid in water. The As (III) concentration was 10 g/l, as for the As (V) concentration described above.

The re-extraction experiments were carried out under the same conditions as mentioned above.

| | Results | |
|---|---|---|
| Duration (minutes) | As(III) Content in Organ. Phase (g/l) | Percent Re-extraction of As(III) |
| 10 | 3.6 | 44 |
| 30 | 3.5 | 45 |
| 60 | 3.5 | 45 |

The experiments show that As (III) can be re-extracted to a high percentage even after 10 minutes. Although As (V) is also re-extracted, longer contact times are required.

This behavior is also evident from the two re-extraction isotherms of organic phases loaded with As (III) and As (V) respectively as described in Examples 6 and 7 below.

EXAMPLE 6

Re-extraction isotherm of As (III)

Experimental conditions: As described in the preceding experiments, except as noted explicitly below.

Loaded organic phase: 6.4 g/l of As (III) from a synthetic solution.

Re-extraction conditions: 10 minutes; 60° C.; distilled water; variation of O/A ratios.

| | | Results | |
|---|---|---|---|
| | ml | As(III) Content | |
| O:A | O:A | O-Phase | A-Phase |
| 5:1 | 50:10 | 5.3 | 6.9 |
| 3:1 | 30:10 | 4.7 | 5.6 |
| 2:1 | 20:10 | 4.1 | 4.8 |
| 1:1 | 20:20 | 3.6 | 3.1 |
| 1:2 | 10:20 | 2.5 | 2.3 |
| 1:3 | 10:30 | 2.2 | 2.1 |
| 1:5 | 10:50 | 1.6 | 1.0 |
| 1:10 | 10:100 | 1.2 | 0.57 |

EXAMPLE 7

Re-extraction isotherm of As (V)

Experimental conditions: As described above, except where explicitly noted below.

Loaded organic phase: 6.8 g/l of As (V) from a synthetic solution.

Re-extraction conditions: As for Example 6, except where noted explicitly below.

| | | Results | |
|---|---|---|---|
| | ml | As(V) Content | |
| O:A | O:A | O-Phase | A-Phase |
| 5:1 | 50:10 | 6.5 | 2.1 |
| 3:1 | 30:10 | 6.3 | 1.6 |
| 2:1 | 20:10 | 5.9 | 1.7 |
| 1:1 | 20:20 | 5.8 | 1.0 |
| 1:2 | 10:20 | 5.8 | 0.57 |
| 1:3 | 10:30 | 5.4 | 0.61 |
| 1:5 | 10:50 | 5.4 | 0.32 |
| 1:10 | 10:100 | 4.7 | 0.20 |

What is claimed is:

1. A process for the removal of one or more contaminant elements, said contaminant elements including at least one of arsenic, antimony, and bismuth and being selected from the group consisting of arsenic, antimony, bismuth, iron, and mixtures thereof, from electrolyte solutions of at least one primary metal and the contaminant element or elements, said process comprising the steps of:

(a) mixing an aqueous mineral-acidic electrolyte solution of primary and contaminant elementor elements with a sparingly water soluble organic solvent phase containing dissolved hydroxamic acid molecules according to the general formula I:

$$R^1 - \overset{\overset{\displaystyle O}{\|}}{C} - NHOH, \qquad (I)$$

wherein $R^1$ represents a straight chain or branched saturated or unsaturated acyclic monovalent aliphatic hydrocarbon moiety containing from 6 to 22 carbon atoms, or a totally or partially cyclic saturated or unsaturated, including totally or partly aryl, hydrocarbon moiety having from 5 to 19 carbon atoms; said mixing being for a sufficient time to cause transfer of at least part of the contaminant element content from the electrolyte solution to the organic solvent phase, so as to produce an organic phase enriched in contaminant element content;

(b) separating the mixed phases from step (a);

(c) mixing the separated enriched organic liquid phase from step (b) with an aqueous extractant liquid phase, said extractant liquid phase consisting essentially of water and sufficient acid or base to give a pH effective for extraction, said mixing being continued for a sufficient time at a sufficient temperature and at a sufficient pH and temperature to cause transfer of at least part of the contaminant-element content from the organic liquid phase to the aqueous extractant liquid phase, so as to produce an intermediately enriched organic liquid phase having a content of contaminant element lower than at the end of step (b) but higher than at the beginning of step (a) and an aqueous extractant phase enriched in contaminant element content;

(d) separating the enriched aqueous extractant phase from the intermediately enriched organic liquid phase present at the end of step (c); and (e) mixing the intermediately enriched organic liquid phase from step (d) with a source of sulfide ions so as to precipitate at least part of the contaminant element content thereof as solid sulfides and produce a depleted organic liquid phase.

2. A process according to claim 1, wherein the primary metal is copper and the aqueous mineral-acidic electrolyte solution contains sulfuric acid.

3. A process according to claim 2, wherein the organic liquid phase consists predominantly of materials selected from the group consisting of hydrocarbons, chlorinated hydrocarbons, ketones, ethers, and mixtures thereof.

4. A process according to claim 3, wherein the organic liquid phase consists predominantly of kerosine.

5. A process according to claim 4, wherein R: represents a neo-alkyl radical having the general formula II:

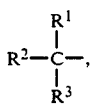

wherein each of $R^1$, $R^2$, and $R^3$ represents a monovalent saturated linear or branched aliphatic hydrocarbon moiety and the sum of the numbers of the carbon atoms of the groups $R^1$, $R^2$, and $R^3$ is within the range of from about 6 to about 18.

6. A process according to claim 1, wherein $R^1$ represents a branched saturated alkyl radical containing from 6 to 22 carbon atoms.

7. A process according to claim 6, wherein the concentration of hydroxamic acid in the organic solvent phase is between about 0.1 to about 2.0 moles per liter.

8. A process according to claim 5, wherein the concentration of hydroxamic acid in the organic solvent phase is between about 0.5 to about 1.0 moles per liter.

9. A process according to claim 1, wherein the concentration of hydroxamic acid in the organic solvent phase is between about 0.1 to about 2.0 moles per liter.

10. A process according to claim 1, wherein the separated enriched organic liquid phase in step (c) contains both As (III) and As (V); the operating conditions in step (c) are such that the As (III) is extracted into the aqueous phase more rapidly than the As (V); the As (V) content, if any, of the enriched aqueous phase at the end of step (d) is subsequently reduced to As (III); and the entire arsenic content of the aqueous phase is precipitated therefrom as an arsenic (III) compound.

11. A process according to claim 8, wherein the mixing of step (c) continues for a time period of from about 10 to about 15 minutes.

12. A process according to claim 1, wherein the mixing of step (c) continues for a time period of from about 1 to about 20 minutes.

13. A process according to claim 10, wherein step (c) is performed at a temperature of from about 50° C. to about 70° C.

14. A process according to claim 1, wherein step (c) is performed at a temperature of from about 20° C. to about 80° C.

15. A process according to claim 1, wherein the volume of aqueous phase used in step (c) is from about 0.05 to about 20 times the volume of the organic phase that is mixed with it.

16. A process according to claim 1, wherein the organic phase mixed in step (c) contains both arsenic and antimony and the pH of the aqueous extractant liquid phase used in step (c) is maintained between about 0 and 3.

17. A process according to claim 1, wherein the organic phase mixed in step (c) contains both arsenic and antimony and the pH of the aqueous extractant liquid phase used in step (c) is maintained at a value greater than 3 but not more than about 6.

18. A process according to claim 1, comprising an additional step of extracting residual iron content from the organic liquid phase produced at the end of step (d) or step (e).

19. A process according to claim 18, comprising an additional step of further processing the organic liquid phase obtained at the end of step (d) or (e), to make the organic solvent content thereof suitable for recycle to step (a).

20. A process according to claim 1, comprising an additional step of further processing the organic liquid phase obtained at the end of step (d) or (e), to make the organic solvent content thereof suitable for recycle to step (a).

21. A process according to claim 1, comprising an additional step of recovering the removed contaminant elements, from the sulfide precipitate formed in step (e) or the enriched aqueous extractant phase obtained after step (d), via pyrometallurgical or hydrometallurgical processes.

* * * * *